Patented Sept. 26, 1922.

1,429,953

UNITED STATES PATENT OFFICE.

NORMAN W. KRASE, OF CLARENDON, VIRGINIA.

MANUFACTURE OF UREA FROM AMMONIA AND CARBON DIOXIDE.

No Drawing.   Application filed March 3, 1921. Serial No. 449,554.

*To all whom it may concern:*

Be it known that I, NORMAN W. KRASE, a citizen of the United States, and a resident of Clarendon, county of Arlington, and State of Virginia, have invented an Improvement in Manufacture of Urea from Ammonia and Carbon Dioxide, of which the following is a specification.

This invention relates to the manufacture of urea, especially relatively pure urea, from ammonia and carbon dioxide and has for its particular objects the effective utilization in said manufacture of fixed nitrogen and the waste carbon dioxide attendant upon its manufacture for the production of a high yield of relatively pure urea, which is peculiarly desirable for agricultural and also technical purposes.

Various attempts, commencing with the work of Basaroff in 1870, have been made to synthesize urea from ammonia and carbon dioxide. The earlier attempts provide relatively insignificant yields. Since 1915 several patents including U. S. Patents Nos. 1,173,550 of 1916; 1,274,503 of 1918; 1,292,019 of 1919 and British Patent No. 23,939 of 1915 have been issued relating to the general method of producing urea by subjecting ammonium carbamate (carbaminate) confined in a reaction chamber, to temperatures ranging from about 135° to 140° C. with or without catalyzers and discharging the sludge containing urea into a distillation vessel wherein the unchanged $NH_3$ and $CO_2$ were pumped off at a temperature of about 80° C. While in these patents, however, neither the yields obtained nor the time of heating are disclosed, it has been heretofore considered in this art that satisfactory results would be obtained at a temperature below 140° C.

Our investigation have led to the discovery that, the rapidity of conversion of carbamate to urea can be very greatly increased and consequently the yield of urea per unit time of treatment can be substantially increased by maintaining a temperature of at least 140° C. and preferably substantially in excess thereof during the conversion period.

In carrying out our invention we preferably proceed as follows:

Relatively pure ammonium carbamate, viz, at least 97% purity, is first prepared in accordance with well known methods, for example the method described by Mente in American Chemical Journal p. 248,235 (1888), or by other suitable methods.

The carbamate is then introduced into a suitable vessel capable of safely withstanding the pressure developed at 160° C. and is subjected therein to a temperature preferably of 150° C. and not above about 165° C. The heating is continued for a relatively short period of time, for example from ½ to 4 hours as contrasted with 20 to 50 hours which has heretofore been customary.

The reaction which results in the formation of urea from ammonium carbamate is represented by the following equation:

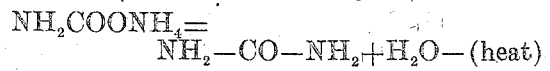
$$NH_2COONH_4 = NH_2-CO-NH_2 + H_2O - (\text{heat})$$

By employing the above described process it is possible to obtain about 40% of the original ammonia as urea and the remainder can be recovered as ammonia which can be reused in the process. Furthermore, it has been found that an amount of water, either in the free or combined state, even up to 10% by weight of the original mass treated does not seriously interfere with the yield obtained, in spite of the fact that water is one of the products of the reaction and hence has at least some inhibiting effect. As is well known, the addition of water to ammonium carbamate results in the formation of ammonium carbonate.

Furthermore, since as stated above, a very considerable quantity of water may be present without interference with the conversion of the carbamate it is possible to use gases from fixed nitrogen works that have not been painstakingly freed from moisture.

As a matter of fact in the commercial operation of my process it is preferable that 2.5 to 3% of water be present in the mass in the reaction vessel though as stated the amount of water should in no case exceed about 10% weight of the ammonium carbamate.

Having thus described my invention what I claim as new and desire to secure by Letters Patent is:

1. The method of making urea which comprises subjecting a mass of ammonium carbamate to a temperature between 140° C. and 165° C. while subjecting the same for a period of not exceeding 4 hours to autogenously developed pressure in a confined space.

2. The method of making urea which comprises subjecting a mass of ammonium carbamate to a temperature between 140° C. and 165° C. while subjecting the same for a period of not exceeding 4 hours to autogenously developed pressure in a confined space in the presence of aqueous fluid.

3. The method of making urea, comprising heating a mass of ammonium carbamate to a temperature between 140° C. and 165° C. and maintaining the same under pressure during the period of heating.

4. The method of making urea comprising subjecting a mass of ammonium carbamate to a temperature between 140° C. and 165° C. for a period of not exceeding 4 hours and maintaining the same under pressure during such heating period.

5. The method of making urea, comprising heating a mass of ammonium carbamate to a temperature of from 140° C. to 165° C. in the presence of an aqueous fluid and maintaining the same under pressure during the heating period.

6. The method of making urea, comprising heating a mass of ammonium carbamate having a water content of not to exceed 10% by weight of the carbamate present to a temperature of from 140° C. to 165° C. and maintaining the same under pressure during the heating period.

7. The method of making urea, comprising subjecting a mass of ammonium carbamate having a water content not to exceed 10% by weight of the carbamate present to a temperature between 140° C. and 165° C. while subjecting the same for a period of not exceeding 4 hours to autogenously developed pressure in a confined space.

NORMAN W. KRASE.